United States Patent [19]

Kinzie

[11] Patent Number: 5,015,312

[45] Date of Patent: May 14, 1991

[54] METHOD AND APPARATUS FOR CONSTRUCTING A THREE-DIMENSIONAL SURFACE OF PREDETERMINED SHAPE AND COLOR

[76] Inventor: Norman F. Kinzie, 45 Brentwood Cir., Needham, Mass. 02192

[21] Appl. No.: 291,389

[22] Filed: Dec. 27, 1988

Related U.S. Application Data

[63] Continuation of Ser. No. 102,577, Sep. 29, 1987, abandoned, which is a continuation-in-part of Ser. No. 36,023, Apr. 8, 1987, abandoned.

[51] Int. Cl.[5] .............................................. B44C 3/02
[52] U.S. Cl. ....................................... 156/63; 156/58; 156/59; 156/252; 156/277; 156/387; 156/510; 156/559; 364/474.5; 364/474.24; 364/522
[58] Field of Search ................... 434/81, 82, 84, 96, 434/98, 132, 147, 150, 152; 364/474.05, 474.24, 522; 156/58, 59, 63, 252, 277, 387, 384, 510, 512, 517, 559; 206/575

[56] References Cited

U.S. PATENT DOCUMENTS

| | | | |
|---|---|---|---|
| 702,615 | 6/1902 | Barden | 434/96 X |
| 1,524,972 | 2/1925 | Hampson et al. | 434/96 |
| 2,138,024 | 11/1938 | Cheesman | 434/150 |
| 2,242,631 | 5/1941 | Stillman | 156/59 |
| 2,556,798 | 6/1951 | Concordet | 434/152 |
| 3,137,080 | 6/1964 | Zang | 434/152 |
| 3,301,725 | 1/1967 | Frontera | 434/82 X |
| 3,534,396 | 10/1970 | Hart et al. | 364/474.24 |
| 3,551,270 | 12/1970 | Sharkey | 156/252 X |
| 3,589,507 | 6/1971 | Greenberg | 206/575 |
| 3,932,923 | 1/1976 | DiMatteo | 156/512 X |
| 4,393,450 | 7/1983 | Jerard | 364/474.24 X |
| 4,687,526 | 8/1987 | Wilfert | 156/277 X |
| 4,752,352 | 6/1988 | Feygin | 156/59 X |

FOREIGN PATENT DOCUMENTS

| | | | |
|---|---|---|---|
| 2368101 | 5/1978 | France | 434/152 |
| 23709 | of 1901 | United Kingdom | 434/82 |
| 652969 | 5/1951 | United Kingdom | 434/96 |
| 0938455 | 10/1963 | United Kingdom | 434/152 |

Primary Examiner—Michael W. Ball
Assistant Examiner—Jeff H. Aftergut
Attorney, Agent, or Firm—Irving M. Kriegsman

[57] ABSTRACT

A method and apparatus are disclosed for constructing a three-dimensional surface of predetermined shape and color from a length of sheet material. A series of color profiles are made along one side of the sheet material in sequence, each color profile corresponding in shape and color to the shape and color of a different cross-section of the surface to be constructed. A coating of a pressure sensitive adhesive is then applied to one side of the sheet material. Areas on the sheet material outside of the profiles are then removed and discarded so as to leave a series of unconnected planar elements, each planar element having an edge shape or outline corresponding to a cross-section of the surface with the color profile itself forming at least a color border or margin on the surface of its respective planar element around the edge. The planar elements are then stacked one on top of the other in proper alignment and sequence and individually laminated together to produce the desired three-dimensional surface. When viewed, the entire surface appears to be colored even though the color is applied only along one side of the planar elements and not along the edges of the planar elements. In another embodiment of the invention the individual planar elements are not made at one location and then transported to the form and stacked one on top of the other but instead are made on the form itself, a layer at a time.

28 Claims, 14 Drawing Sheets

METHOD AND APPARATUS FOR CONSTRUCTING A THREE-DIMENSIONAL SURFACE OF PREDETERMINED SHAPE AND COLOR

CROSS-REFERENCE TO RELATED APPLICATIONS

This is a continuation of application Ser. No. 102,577, filed Sept. 29, 1987, now abandoned, which is a continuation-in-part of U.S. application Ser. No. 036,023, now abandoned, filed in the name of Norman F. Kinzie on Apr. 8, 1987.

BACKGROUND OF THE INVENTION

The present invention relates generally to a method and apparatus for constructing a surface of predetermined shape and color and more particularly to a method and apparatus for constructing a three-dimensional surface of predetermined shape and color by laminating together a plurality of individually shaped and individually colored planar elements, the planar elements being made from sheet material. The invention is especially useful in constructing topograhical models and will hereinafter be described by way of example in making the specific type of three-dimensional form; however, it is to be understood that the invention is not exclusively limited to topographical models, but rather may find utility in constructing three-dimensional surfaces of predetermined shape, both single and multi-colored, which may be used for other purposes as well as single and multi-colored two-dimensional surfaces.

Topographical models are well known in the art and are commonly used by architects and others to display a scaled down version of a landscape of interest.

Typically, these models have multi-colored surfaces (i.e. a pattern of different colors on their surface) with one color, such as green, being used to designate grass or other similar materials, another color, such as black, being used to designate streets or sidewalks and the like, still another color, such as blue, being used to represent lakes or swimming pools and so forth.

In the past, topographical models have been constructed usually by either one of two ways.

One way has involved taking a plurality of sheets of cardboard, cork or plastic, the sheets usually being on the order of about one-sixteenth of an inch thick, cutting each sheet so that it has a shape corresponding to the shape of a different cross-selection on the topographical model to be constructed, stacking the cut sheets one on top of the other in proper alignment to form the desired surface, glueing the individual sheets together as they are being stacked and then after the sheets have been laminated together painting the various colors onto the resulting surface at the proper locations. When applying the different colors, it has usually been necessary to first mask off the individual areas which are to be treated so that the colors will be apllied only where intended. One of the problems with this technique is that it is somewhat difficult and time consuming to apply a color pattern to an otherwise completed model, especially since in most cases the colors must be applied along the edges of the sheets as well as the tops (i.e. top surfaces) of the sheets. Also, the procedure of applying the colors as a separate operation after the surface is otherwise completed is itself a disadvantage. Another problem with this arrangement is that although it does involve using cutting tools such as knives or end mills or lasers for cutting out the actual shapes of the different layers, the assembly and coloring is essentially a manual technique. Still another problem with this approach is that the resolution of the finished surface is limited to the thickness of cardboard, cork or plastic material used to make the sheets. In many cases, this is not entirely satisfactory.

The other way that has been employed in the past for making topographical models has involved taking a solid block of an easily cutable material, such as polyurethene, cutting the block to obtain the desired shape using some type of milling machine and then painting on the different colors at the proper locations to produce the desired color pattern. As can be appreciated, this technique can by very time consuming and requires considerable manual skills in both cutting the block to the desired shape and applying the colors at the proper locations, especially if the surface has a very irregular shape and a pattern containing many different colored areas some or all of which may have fairly complex shapes.

In U.S. Pat. No. 3,932,923 to P. L. DiMatteo there is disclosed a method for constructing a three-dimensional surface of predetermined shape comprising the steps of defining the surface to be constructed, measuring a plurality of cross-sections of the defined surface, generating a substantially planar element for each cross-section corresponding to the respective measured cross-section of the defined surface and stacking the generated elements adjacent to one another in predetermined sequence to form the surface, the sequence of the stacked generated elements corresponding to the sequence of the plurality of cross-sections of the defined surface. A number of different ways are disclosed for securing the planar elements together. One way involves using an adhesive agent. Another way involves passing a bolt through the entire stack and then applying a nut at the other end. No mention is made in the patent concerning the application of color or of making multicolored surfaces or of automated transport or registration of materials.

It is an object of this invention to provide a new and novel method and apparatus for constructing a three-dimensional surface of predetermined shape and color.

It is another object of this invention to provide a new and novel technique for constructing a colored three dimensional surface which is made up of a stack of colored planar elements of varying size and shape.

It is still another object of this invention to provide a method and apparatus for constructing a three-dimensional surface of predetermined shape using a plurality of layers of papaer thin sheet elements cut from a roll of sheet material.

It is yet still another object of this invention to provide a method and apparatus for constructing a three-dimensional surface of predetermined shape and color which is computer controlled.

It is another object of this invention to provide a method and apparatus for constructing a three-dimensional surface of predetermined shape and color which involves laminating together a plurality of sheets of material and wherein the color for producing the desired color pattern on the resulting surface is applied to the individual sheets before they are laminated together.

It is a further object of this invention to provide an apparatus as described above which can also be used, if desired, to construct a two dimensional surface of predetermined shape and color.

It is another object of this invention to provide a method and apparatus for constructing a three-dimensional surface of predetermined shape and color in which sheets of material are stacked one on top of the other before they are shaped and colored to form planar elements.

SUMMARY OF THE INVENTION

A method of constructing a three-dimensional surface of predetermined shape and color pattern according to the teachings of the present invention in one embodiment comprises providing information corresponding to the desired shape and color pattern of the surface to be constructed, providing a length of sheet material that is either color transmitting or ink absorbing, using said information drawing a series of color profiles in sequence along the length of the sheet material on one side thereof in accordance with said information, the color material (i.e. ink, pencil, toner, paint, etc) and the particular technique used for drawing the color profiles (i.e. pen, ink jet. laser, drafting tool, etc.) depending on the particular type of sheet material used, the outline of each color profile corresponding to the outline of a different cross-section on the surface and the color of each color profile corresponding to the color of the respective cross-section, the sequence in which the series of color profiles are formed on the sheet material corresponding to the sequence of the cross-sections on the surface, removing the sheet material surrounding or otherwise not intended to be a part of each color profile so as to produce a series of unconnected (colored) planar elements, each planar element having a shape corresponding to its color profile with the color profile itself either completely covering or forming at least a border or margin along its edge, and stacking the planar elements so produced adjacent one another in the sequence in which the color profiles are formed, laminating the planar elements together individually as they are being stacked so as to produce the desired three-dimensional surface, the color pattern of the resulting surface corresponding to the color pattern produced by the colors of individual color profiles on the surfaces of the individual planar elements.

An apparatus for constructing a three-dimensional surface of predetermined shape and color according to the teachings of the present invention in the embodiment described above comprises means for holding a supply of sheet material that is either color transmitting or ink absorbing, profile drawing means for receiving the sheet material from the holding means and drawing thereon a series of color profiles in sequence along its length, each profile corresponding in shape to the outline of a different cross-section on the desired surface, the color of each color profile corresponding to the color of the respective cross-section the sequence of the series of profiles corresponding to the sequence of the cross-sections, removing means for detaching sheet material surrounding each color profile in a manner so as to leave a series of unconnected individually shaped color planar elements, each planar element having a shape corresponding to a different cross-section with the color profile either covering completely or forming at least a border or margin along its edge and means for stacking and laminating the shaped planar elements so produced adjacent to one another in the predetermined sequence to form the three-dimensional surface, the surface color perceived of the resulting surface corresponding to the color of the individual color profiles.

In another embodiment of the invention, the planar elememts are cut to shape and size and colored while in place on the form being constructed, a layer at a time.

Various features and advantages will appear from the description to follow. In the description, reference is made to the accompanying drawings which forms a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

In order that the invention may be more fully understood, it will now be described, by way of example, with reference to the accompanying drawing in which like reference numerals or characters represent like parts.

BRIEF DESCRIPTION OF THE DRAWINGS

In the drawings wherein like reference numerals represent like parts.

DETAILED DESCRIPTION OF PREFERRED EMBODIMENTS

Figure 1:
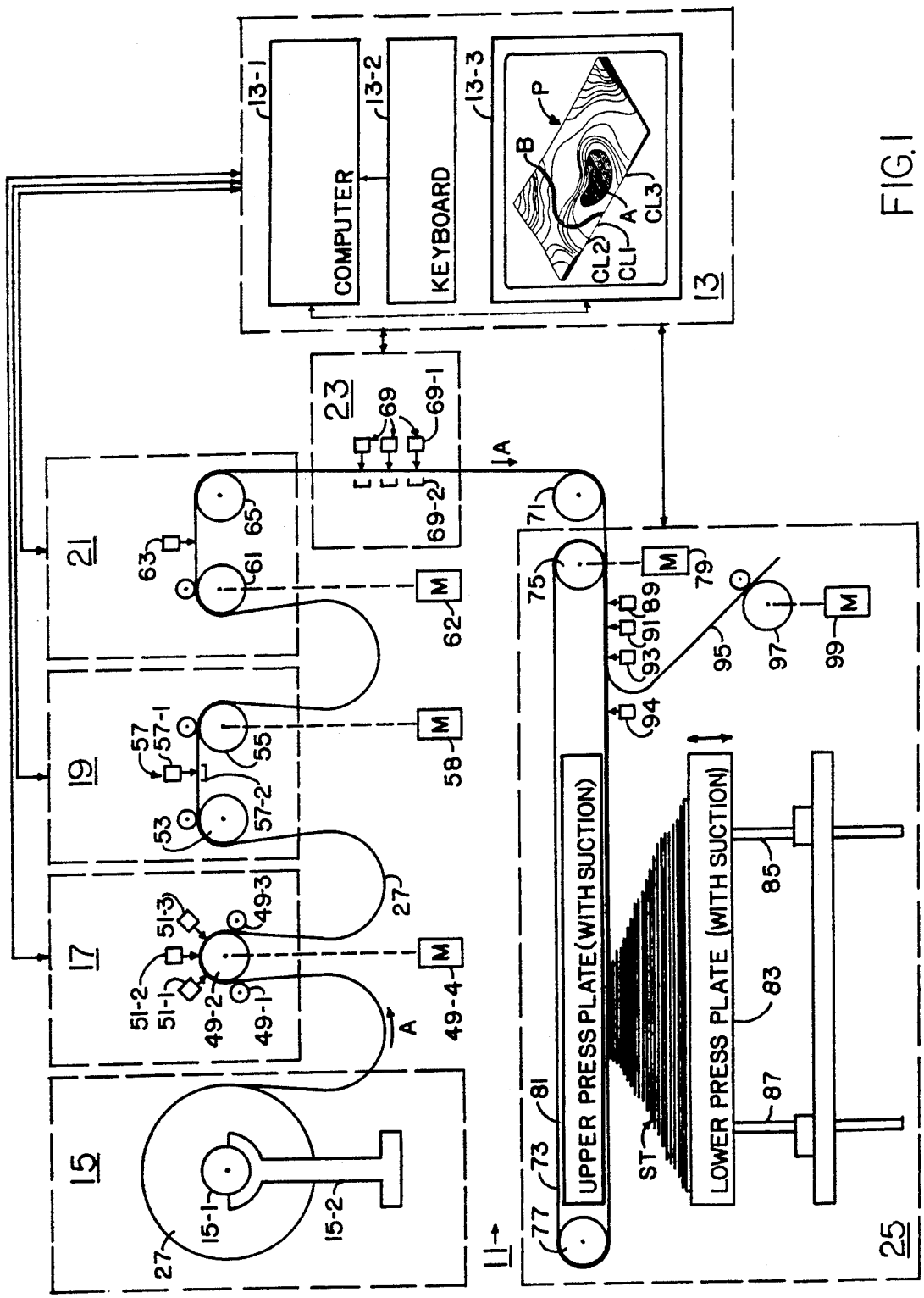
FIG. 1 is a simplified diagrammatic representation one embodiment of an apparatus for constructing a three-dinemsional surface of predetermined shape and color according to this invention.

Referring now to the drawings there is shown in FIG. 1 a simplified diagrammatic view of an embodiment of an apparatus for constructing a three-dimensional surface (i.e. form) of predetermined shape and color according to this invention, the apparatus being identified by reference numeral 11. For ease in viewing, portions of the apparatus not pertinent to the invention are not shown.

For illustrative purposes, the particular three-dimensional surface to be constructed is a topographical model. Apparatus 11 includes a computer station 13, a stock holding station 15, a printing or profile forming station 17, a perforating station 19, an adhesive applicator station 21, a profile cutting station 23 and a laminating and shearing station 25.

Computer station 13 includes a computer 13-1 which is used to control the operations of printing station 17, perforating station 19, adhesive applicator station 21, profile cutting station 23 and laminating and shearing station 25. Computer 13-1 includes a memory section in which is loaded X-Y-Z coordinate information or information in the form of mathematical equations corresponding to the shape of the surface to be constructed as well as information as to the color pattern to be applied to the surface over its entire area; the manner in which the information is initially obtained, the specific way in which the information so obtained is fed into computer 13-1 and any subsequent processing of the information while it is in computer 13-1 is not being a part of this invention.

Computer station 13 also includes a keyboard 13-2 for use in inputting instructions and/or data to computer 13-1 and a color monitor 13-3 for displaying information such as a picture of the surface S to be constructed. In FIG. 1, a picture P depicted in color monitor 13-1 is that of the particular topographicl model TM to be constructed. In picture P the area identified by the letter A and cross-hatched represents an area of one color such as blue and which may be for example, a lake, the area identified by the letter B another color such as black and which may be, for example, a street and the remaining area which is not cross-hatched at all another color such as green and which may be, for example, an area covered with grass.

Figure 2:
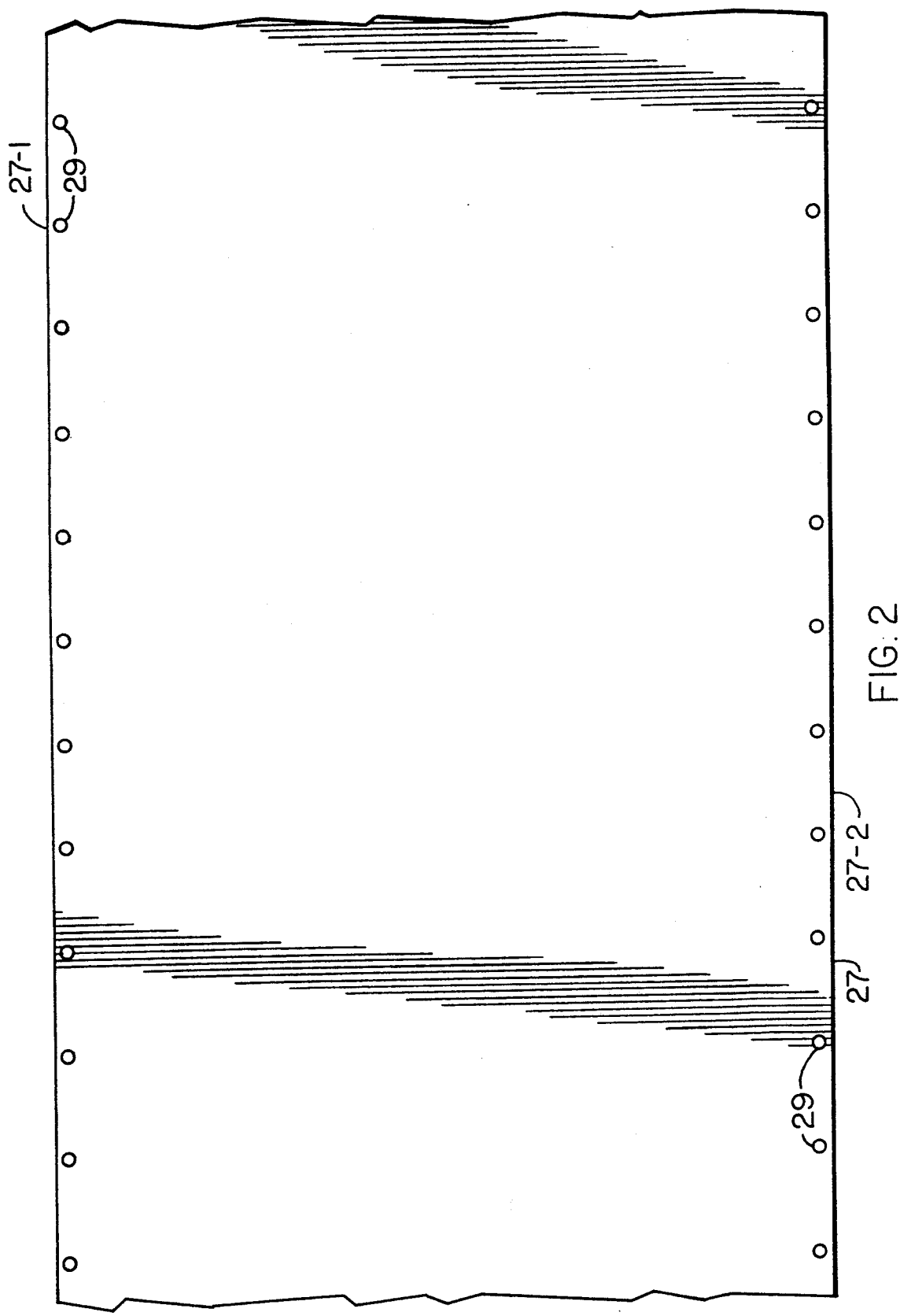
FIG. 2 is a plan view of a length of the sheet material shown in FIG. 2 before it reaches the printing station.

Stock holding station 15 holds a supply of the stock which is used to construct the three-dimensional surface. The stock shown is sheet material 27 and may either be a type that has the property of being color transmitting or a type that has the property of being ink absorbing. For illustrative purposes, sheet material 27 will be assumed to be color transmitting. As used herein, the term color transmitting refers to a type of sheet material that will transmit color through an edge when the color is applied to either the top or bottom surface of the sheet material in the vicinity of the edge. For example, if the top surface is colored blue, the edge, when viewed, will also appear to be colored blue. On the other hand, a material that is ink absorbing is one that will absorb ink or other similar liquid coloring material. Examples of color transmitting sheet materials are polyester, acrylic and polycarbonate type plastics. Sheet material 27 is in the form of a roll and is mounted on a spindle 15-1 which is supported in a suitable holder 15-2. The thickness of sheet material 27 is preferably on the order of about ten thousandths of an inch. A plan view of a length of the sheet material 27 as it leaves stockholding station 15 is shown in FIG. 2. As can be seen sheet material 27 is provided with sprocket holes 29 along its upper edge 27-1 and along its lower edge 27-2 for use in accurate handling and alignment of the material as it passes through the laminating and shearing station 25 as will hereinafter be explained.

Plan views of the same portion of sheet material 27 as it progresses through the other stations are shown in FIGS. 4 through 7 and 9.

After leaving stock holding stations 15, sheet material 27 moves as shown in the direction of the arrows A in FIG. 1 and passes in sucession through printing or profile forming station 17, perforating station 19, adhesive applicator station, profile cutting station 23 and laminating and shearing station 25.

Printing station 17 receives sheet material 27 from stock holding station 15 and draws (i.e. plots) a series of color profiles CP in sequence on one side 27-3 of sheet material 27 along its length, each color profile CP corresponding in shape and color to the shape and color of a different cross-section or contour line of the three-dimensional surface to be constructed, the cross-sections selected being in the same sequence as the sequence in which the color profiles are formed along the length of sheet material 27. In essence, each color profile CP corresponds to an X-Y plot in color of the surface to be constructed for a different value of Z, where X, Y and Z are three orthogonal or mutually perpendicular axes. In order to minimize the amount of coloring material used in making the color profiles the width of the plot of each color profile over its entire length (i.e. the actual area covered by the coloring material) is made just sufficient to cover the exposed portion of the planar element and/or to provide the perception of color along an edge when desired even though the planar surface is not exposed as will hereinafter be explained. The particular width of each color profile CP over its entire length is controlled by computer 13-1.

Figure 4:
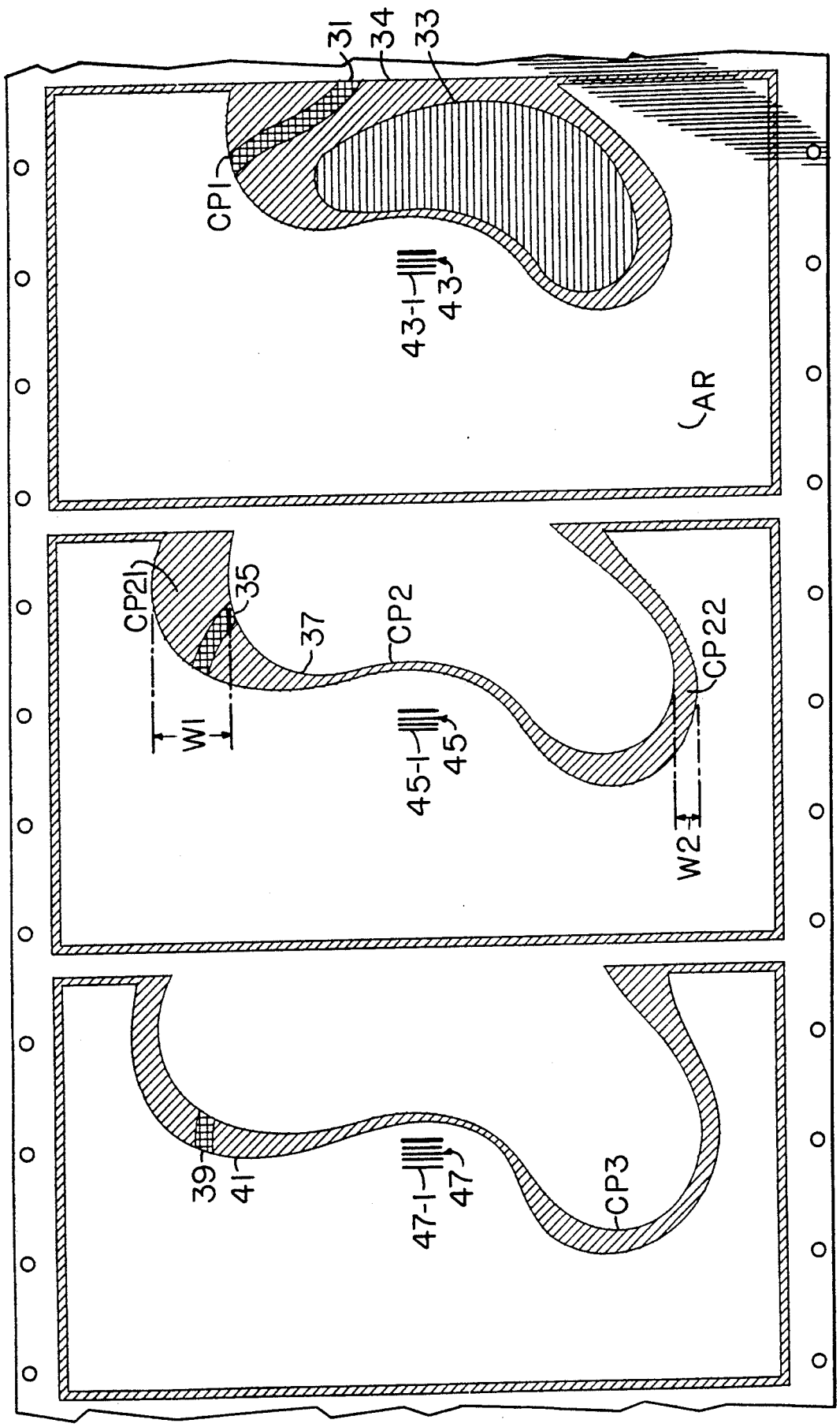
FIG. 4 is a plan view of the length sheet material shown in FIG. 2 after is passes the printing station and before it enters the perforating station.

A plan view of portion of sheet material 27 after is has passed through printing profile forming station 17 is shown in FIG. 4. In the portion shown there are three profiles, each profile being for a different cross-section. The three profiles which are shown are labelled CP1, CP2 and CP3 and are the profiles for the first three profiles to be drawn, namely the profiles for the bottom, next to bottom and second from bottom cross-sections which are labelled CL1, CL2 and CL3, respectively in the surface shown in the screen of monitor 13-3 in FIG. 1. The first profile CP1 has an area identified by reference numeral 31 which is shaded to represent the color black, another area which is identified by reference numeral 33 and shaded to designate the color blue. The remainder 34 of profile CP1 is shaded a third way to designate the color green. The area AR inside profile CP1, which will not be visible when the profiles are subsequently laminated, is not colored. In profile CP2, portion 35 is shaded to show black and portion 37 is shaded to show green. In profile CP3, portion 39 is shaded to show black and portion 41 is shaded to show green. As can be seen, the profiles vary in width over their entire length, the width being just sufficient to cover the are inside the profile that will be exposed when assembled. If the entire profile is visible then the entire profile is colored. For example, in profile CP2 the width W1 at area CP21 is greater than the width W2 at area CP22.

A unique registration mark in the form of a bar code is positioned inside each color profile CP1, CP2 and CP3, the registration marks being labelled 43, 45 and 47. The registration marks serve to identify the individual color profiles. In addition, a portion of each mark, such as the bar at the leading edge, (i.e. bar 43-1 in mark 43, bar 45-1 in mark 45 and so forth) is used to monitor and adjust, if necessary, the alignment of the profiles in the x-direction (i.e. longitudinally along the length of sheet material) when the color profiles are stacked on one another in laminating and shearing station 25.

Profile forming station 17 includes three rollers 49-1, 49-2 and 49-3 which are used in moving sheet material 27 in the X direction. Roller 49-2 is powered by a stepping motor 49-4 which is under the control of computer 13-1. A plurality of printing or coloring devices 51-1, 51-2 and 51-3, each having a supply of a different colored ink, are disposed above roller 49-2, the number of devices 51 shown being for illustrative purposes only. Devices 51 are each mounted on a separate supporting structure and are moveable by separate stepping motors transversely across sheet material 27 (i.e. in the Y direction), the movement of devices 51 as well as the time intervals during which ink is dispensed from the devices 51 being under the control of computer 13-1.

Figure 3:
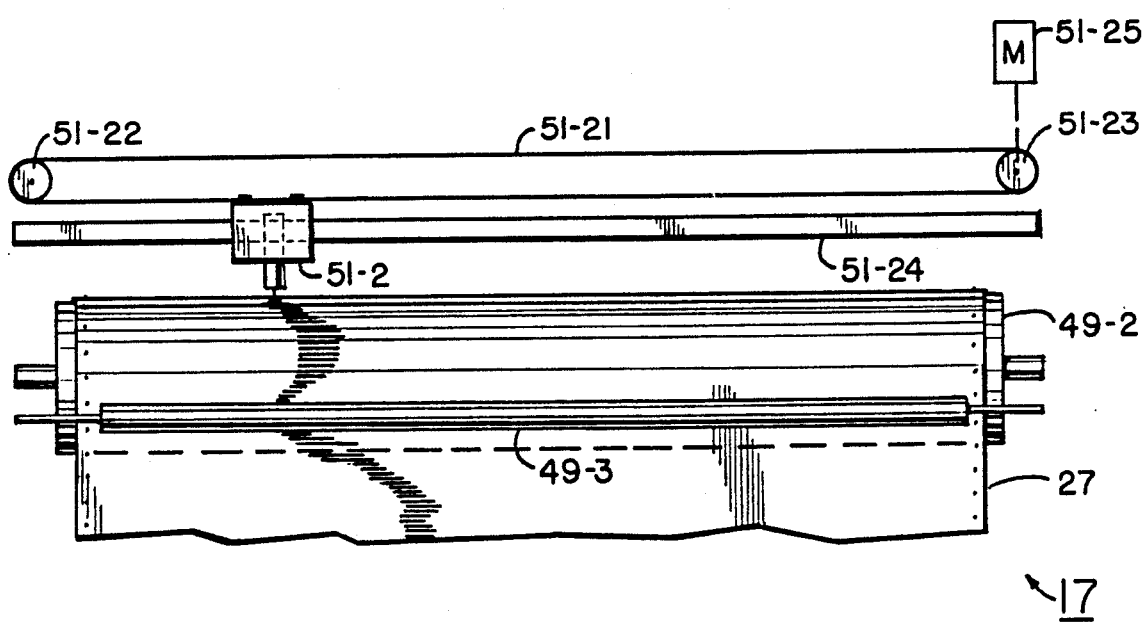
FIG. 3 is a simplified elevation view of the printing station shown in FIG. 1 with certain parts omitted.

An elevation and somewhat more detailed view of station 17, is shown in FIG. 3. For simplicity, devices 51-1 and 51-3 and their associated supporting structure are not shown. As can be seen, device 51-2 is mounted on an endless belt 51-21 which is mounted on rollers 51-22 and 51-23 and is guided by a guide bar 51-24. Roller 51-23 is driven by a stepping motor 51-25.

Instead of dispensing ink, devices 51 may contain and dispense other liquid type coloring agents such as paint or liquid toner or even dry type coloring agents such as pencil lead or dry toner. However, if sheet material 27 is ink absorbing rather than color transmitting, the coloring agent in printing station 17 must be a liquid and must be a type of liquid that is capable of being absorbed by the sheet material.

As will hereinafter be explained, a series of colored planar elements are formed, each shaped according to a color profile.

Perforating station 19 receives material 27 from printing station 17 and forms a plurality of perforations 54 in the area within each individual color profile, (except for the area containing the bar code) that will not be exposed when the planar element to be constructed containing the particular profile is assembled. The perforations serve to prevent any blistering of the profiles when they are laminated together in laminating and shearing station 25 as will hereinafter be described. Perforations 54 also serve to reduce the overall weight of the individual planar elements containing the profiles. Perforating station 19 includes a pair of roller feeds 53 and 55 and a hole cutter 57. In the illustrative embodiment, hole cutter 57 is in form of a punch 57-1 and die 57-2. Roller feed 55 is powered by a stepping motor 58. Roller feed 55 and hole cutter 57 are both under the control of computer 13-1. Instead of a punch and die, hole cutter 57 may be in the form of a laser or other equivalent device for making holes.

Figure 5:
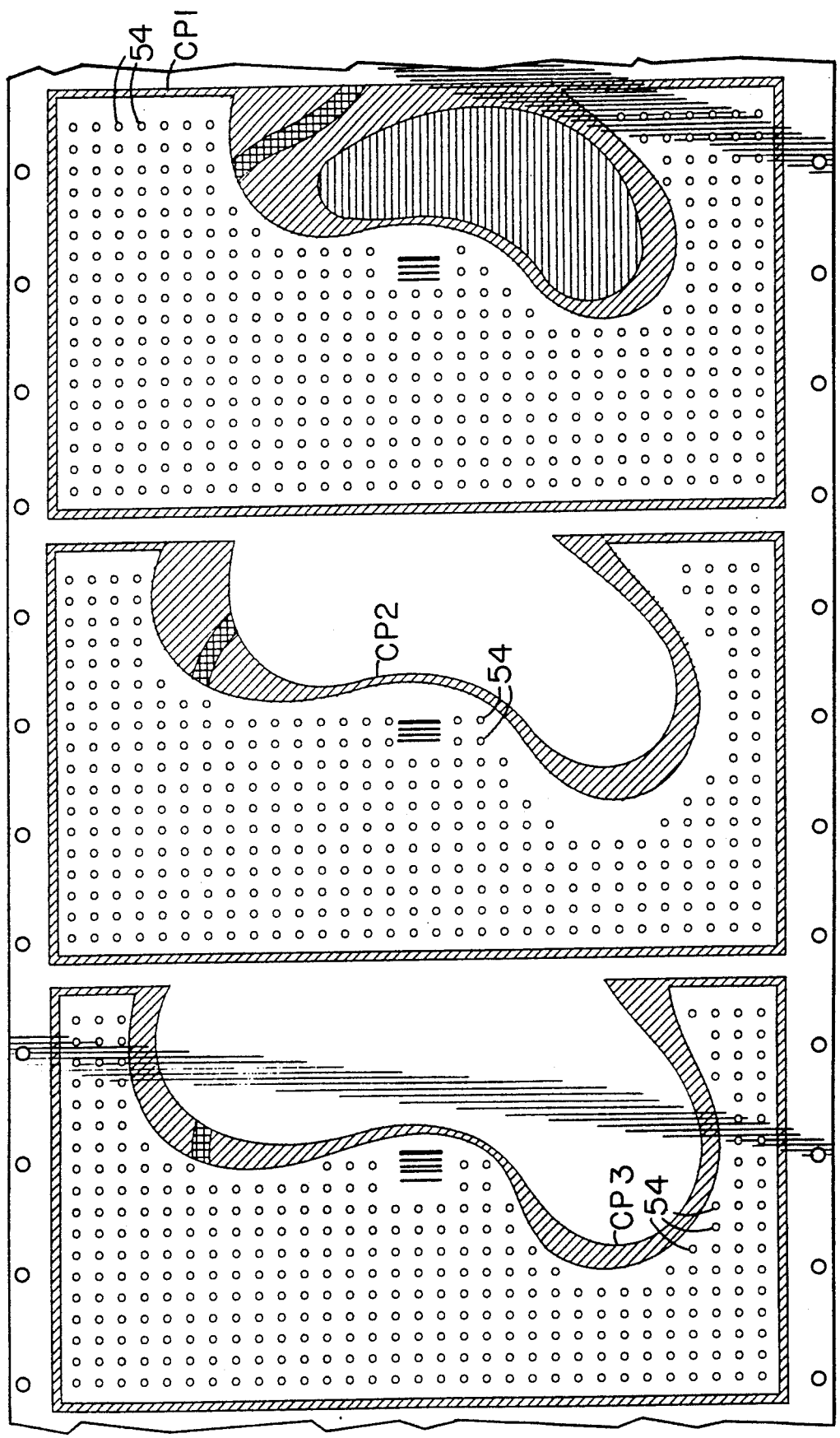
FIG. 5 is a plan view of the length sheet material shown in FIG. 2 after it passes the perforating station and before it enters the adhesive applicating station.

A plan view of a portion of sheet material 27 after it leaves perforating station 19 is shown in FIG. 5.

Adhesive applicator station 21 receives sheet material 27 from perforating station 19 and applies a layer of an adhesive 59 over each profile as well as the area inside each profile for use in laminating the profiles together as will hereinafter be explained. The apparatus within adhesive applicator station 21 includes a roller feed 61 at the inlet end which driven by a stepping motor 62, an adhesive dispensing device 63 mounted on a supporting structure (not shown) and arranged for translation movement across sheet material 27 and a roller 65 at the outlet end. The stepping motor 62 for driving roller feed 61 along with the mechanism for moving adhesive dispensing jet 63 and the mechanism for activating and deactivating jet 63 to dispense the adhesive are all under the control of computer 13-1. The adhesive 59 contained in device 63 is pressure sensitive. Alternately, adhesive 59 may be heat sensitive rather than pressure sensitive or if the particular sheet material 27 used is a plastic, the material dispensed in jet 63 may be any suitable solvent type bonding agent used with plastics.

Figure 6:
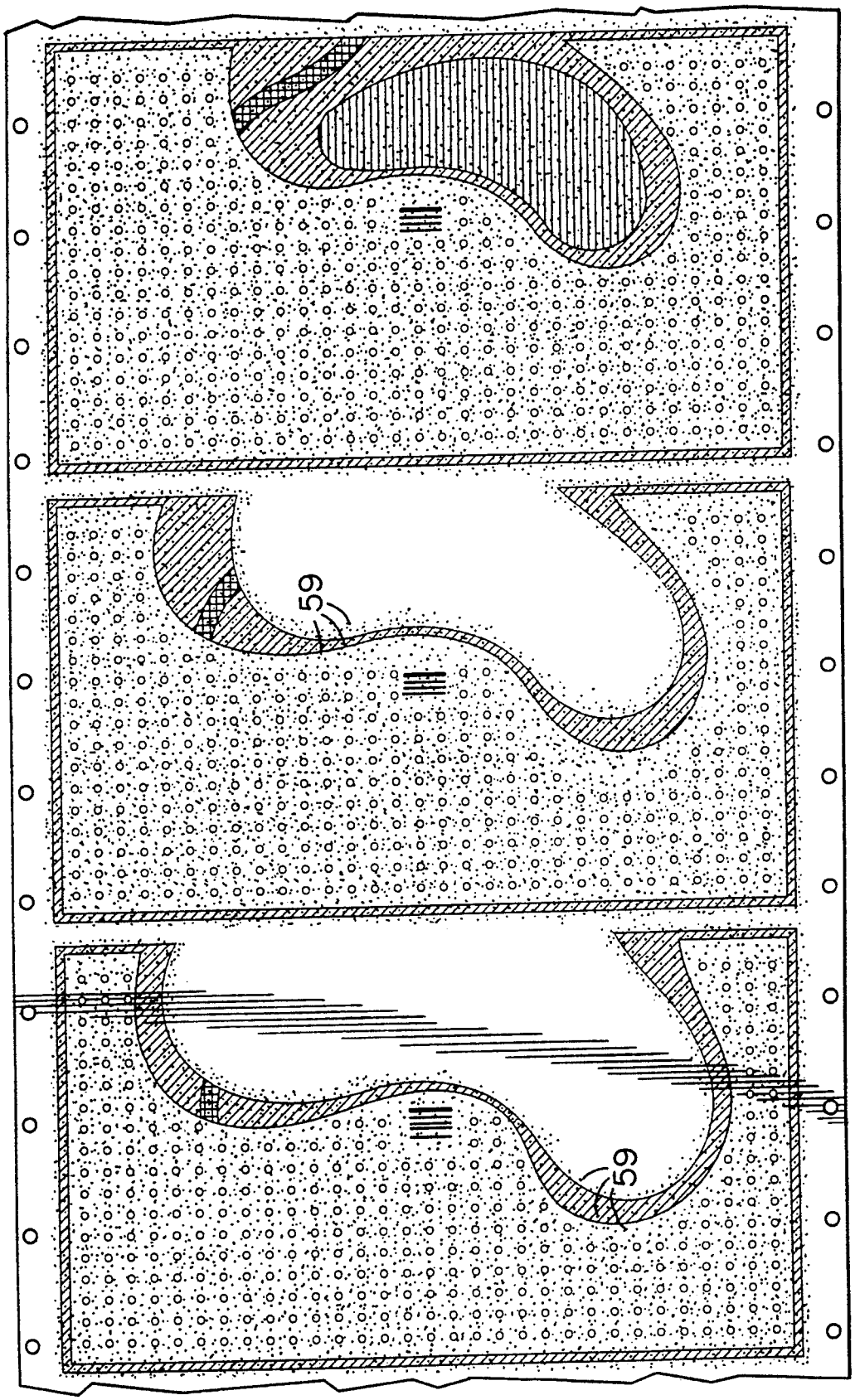
FIG. 6 is aplan view showing how the length of sheet material in FIG. 2 appears between the adhesive applicating station and the profile cutting station.

A plan view of the portion of sheet material 27 after it leaves adhesive applicator station 21 is shown in FIG. 6, with the adhesive 59 being depicted as an array of fine dots.

After being coated with adhesive 59, sheet material 27 is passed through profile cutting station 23 where a cut T is made along the edge of each profile CP, the cut shape defining a colored planar element PE of predetermined size. The cut is complete, except for small uncut areas or tabs 67 which are left along the cut line at selected locations to keep the individual planar elements PE attached to the sheet material. The apparatus in profile cutting station 23 includes a plurality of cutting devices 69 which are mounted (by means not shown) for translation movement across sheet material 27, the mechanism for providing movement of the cutting devices and the activation of the cutting devices both being under the contol of computer 13-1. Each of the cutting devices 69 may be a laser or a square punch and die or other equivalent device. In the drawing, cutting devices 69 are shown as punch 69-1 and die 96-2 combinations.

Figure 7:
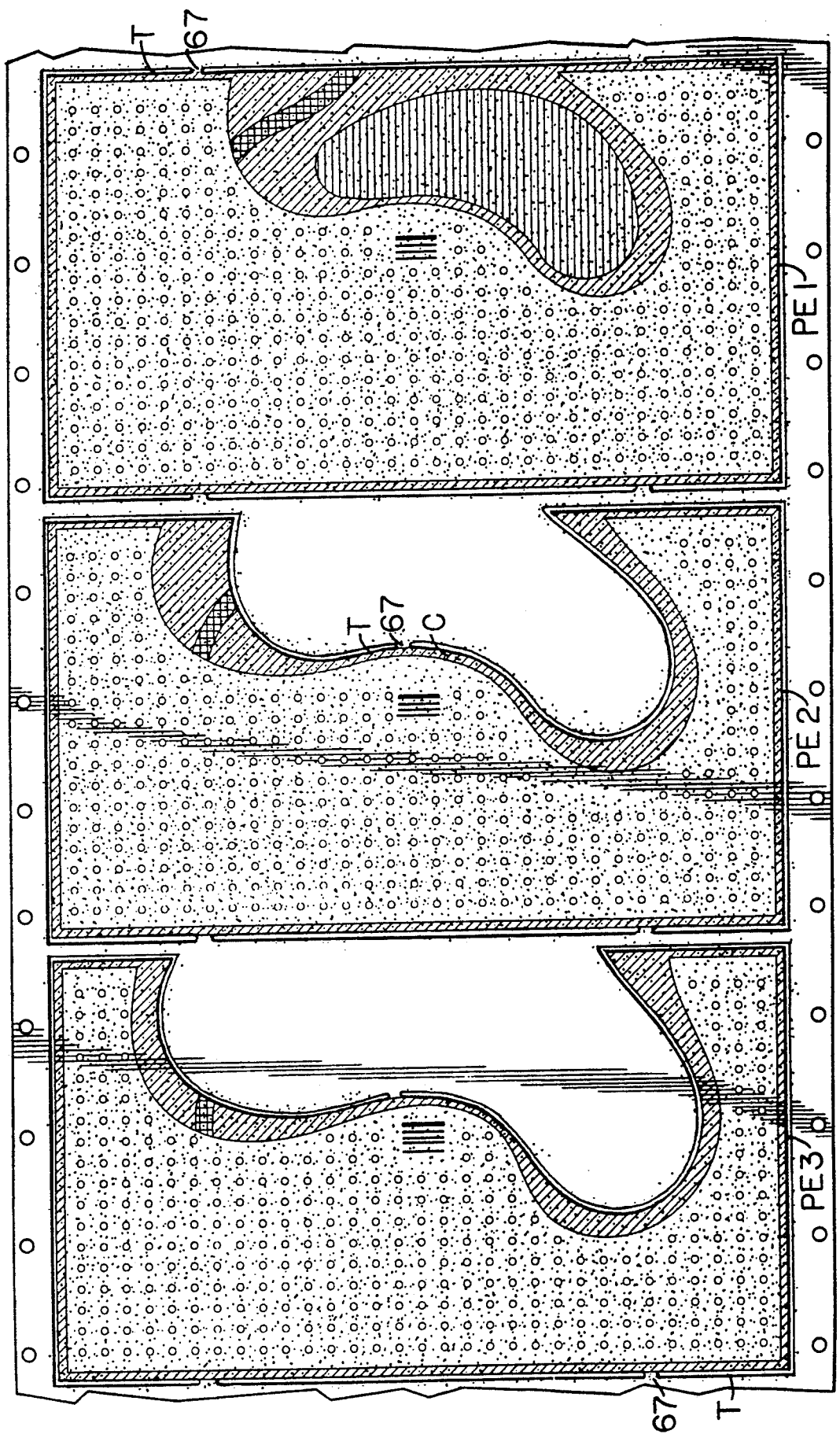
FIG. 7 is a plan view showing how the length sheet material in FIG. 2 appears between the profile cutting station and the laminating and shearing station.

A plan view of the portion of sheet material 27 after it leaves cutting station 23 is shown in FIG. 7. As can be seen, there are three colored planar elements PE1, PE2 and PE3 respectively connected to sheet material 27 by tabs 67.

From profile cutting station 23, sheet material 27 is passed around a roller 71 and then fed into laminating and shearing station 25. In laminating and shearing station 25 planar elements PE are completely separated from the surrounding sheet material 27 and then laminated one on top of the other in proper registration.

Laminating and shearing station 25 includes a continuous belt 73 which is mounted on a pair of rollers 75 and 77, a stepping motor 79 for driving roller 75, a first press plate 81 which is disposed inside belt 73, a second press plate 83 which is disposed underneath belt 73, a plurality of linear actuators, two labelled 85 and 87 of which are shown in FIG. 1 and labelled 85 and 87, for supporting plate 83 and selectively moving plate 83 up and down, a pair of cut-off shears 89 and 91, a waste lifter 93 a registration scanner 94, a deflector 95 and a roller feed 97 which is powered by a motor 99.

Figure 8:
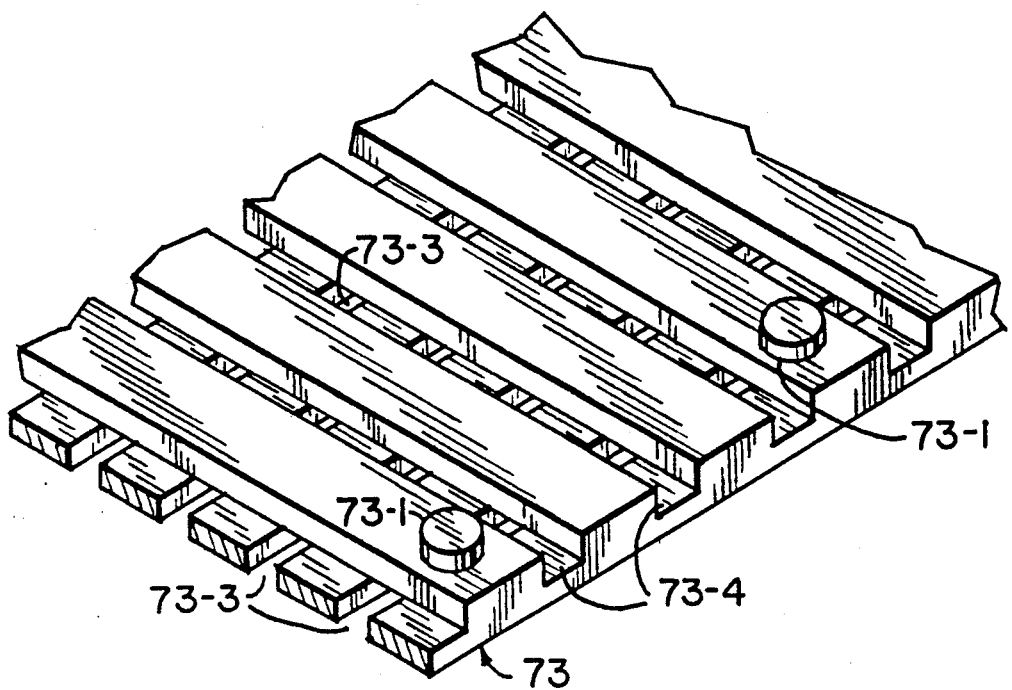
FIG. 8 is a perspective view of a portion of the continuous belt in the laminating and shearing station shown in FIG. 1.

Belt 73 is made of a fairly durable material such as stainless steel and is constructed to include sprockets 73-1 along its top surface. Belt is also constructed to include a set of longitudinal slots 73-3 and a set of lateral slots 73-4 shown in FIG. 8 with the intersections between the two sets of slots defining air spaces. The spacing between adjacent lateral slots 73-4 is less than the length of tab portion 67 in the direction (i.e. along the length of material 27). Cut-off shears 89 and 91 and registration scanner 93 are each mounted on separate supports 94 and are movable translationally across sheet material 27 by separate stepping motors. The operation of shears 89 and 91 and scanner 94 is controlled by computer 13-1.

Laminating and shearing station 25 processes sheet material 27 to produce the desired surface in the following manner.

Figure 9:
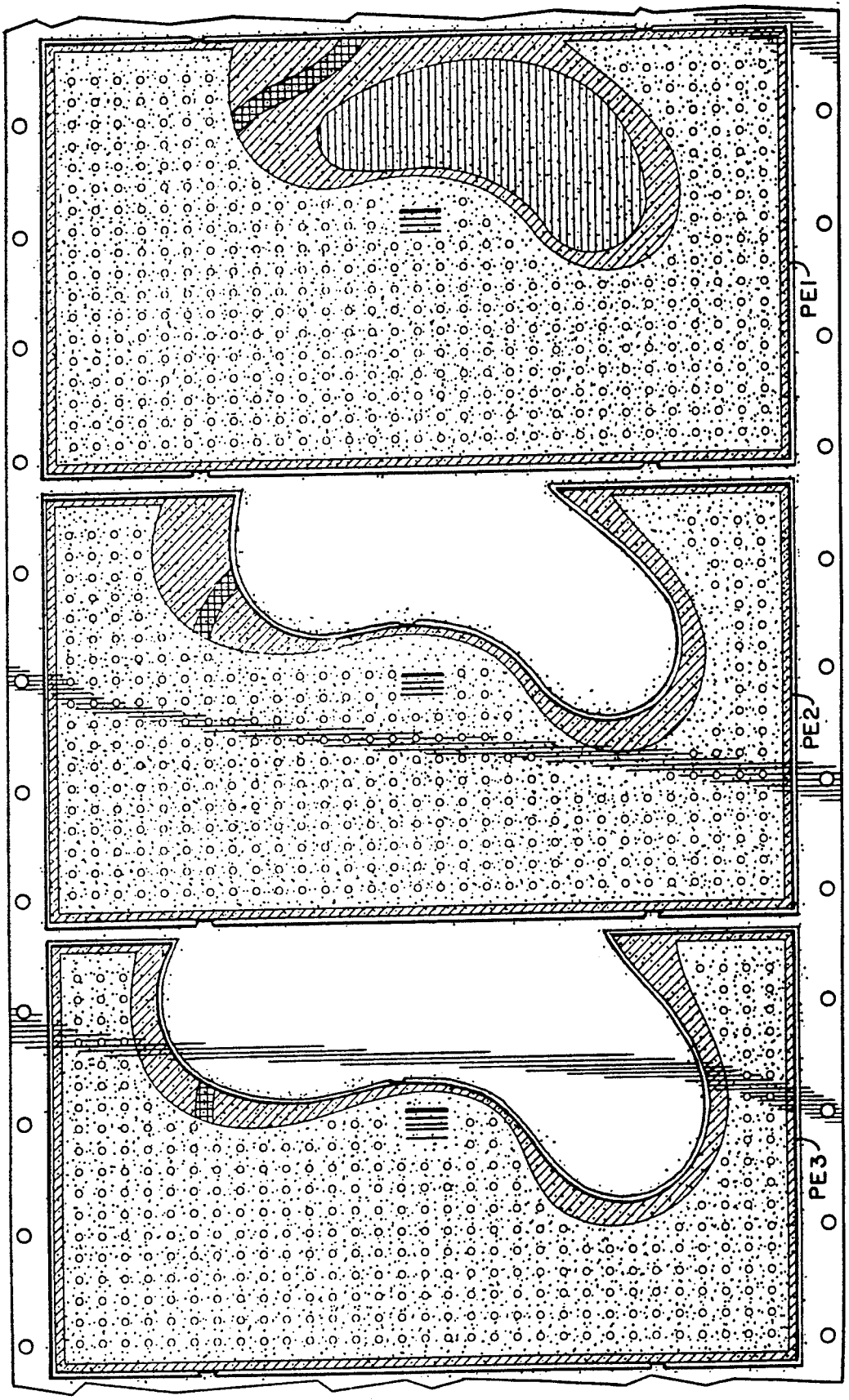
FIG. 9 is a plan view showing how the length of sheet material in FIG. 2 appears after passing the cutoff shears in the laminating and shearing station.
Figure 10:
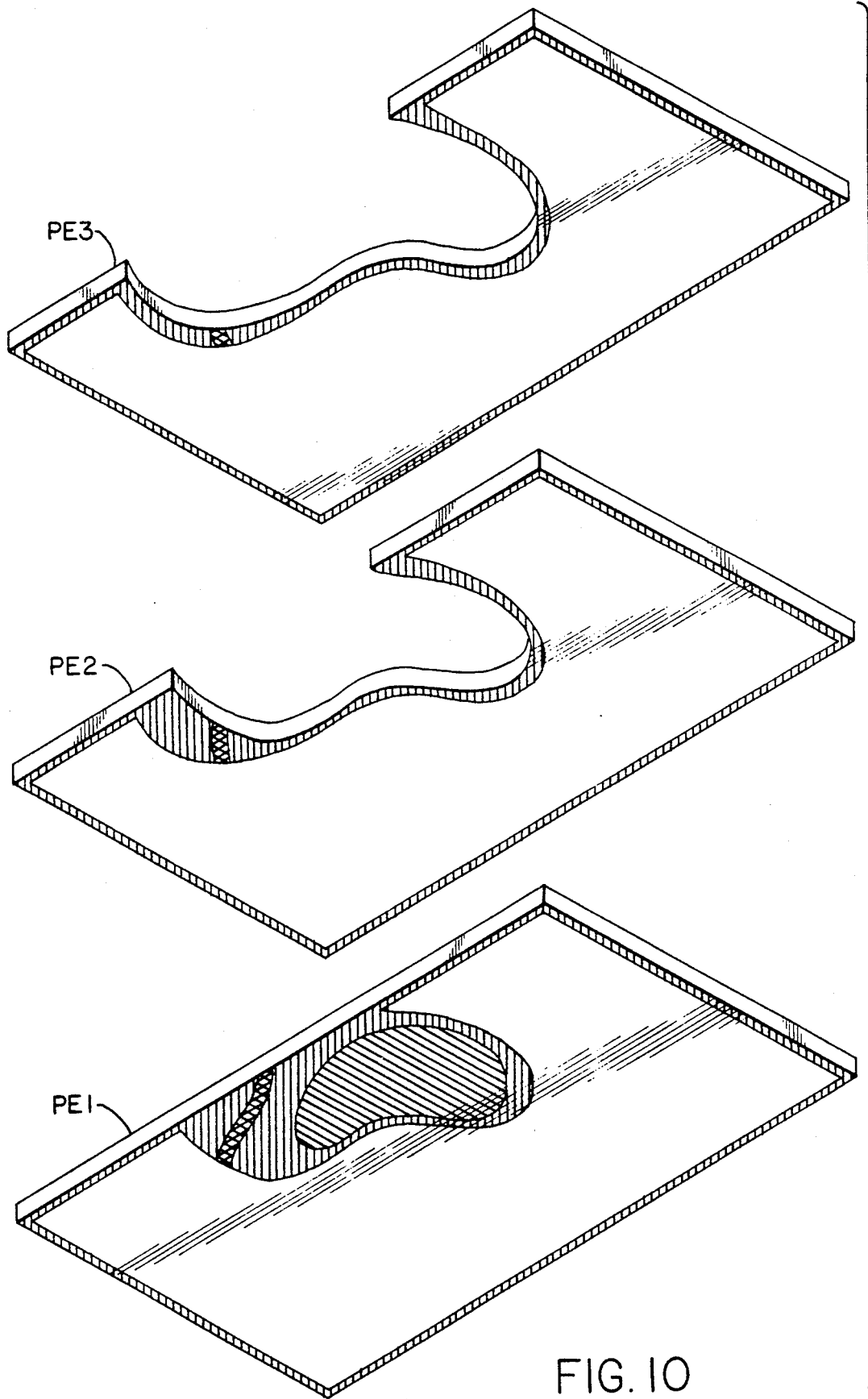
FIG. 10 is an exploded perspective view greatly enlarged in thickness of the three planar elements shown in FIG. 9 as arranged in a stack with adhesive and perforations omitted.

As sheet material 27 enters station 25 it is first fed onto belt 73 where the sprockets 73 on the belt are brought into engagement with the sprocket holes 29, shown in FIG. 2 on the sheet material. Belt 73 pulls the sheet material underneath first press plate 81 which is perforated and equipped with suction. The suction is controlled by computer 13-1. The suction pulls sheet material 27 up so that its entire surface area is held in contact with belt 73. The tab portions on the planar elements are then severed completely using the cut-off shears 89 and 91 which move transversly across the sheet material 27, each directly below a transverse slot 73-4 on belt 73. Cut-off shears 89 and 91 are under control of computer 13-1 and may be, for example, in the form of a knife edge or a razor or a laser. The fully separated color profile CP which is now in the form of a colored planar element PE, shown in FIG. 9, is now ready for stacking and laminating.

The material surrounding but now detached from the colored planar elements and in an continuous length of scrap, is caught by a fixed position deflector 95 and led by roller 97 into a waste shredder (not shown). A computer controlled waste lifter 93, which may be in the form of a motor actuated suction grip, pulls off any cut areas within the profiles that must also be removed. The longitudinal position of the planar elements on belt 73 as well as their unique identification number (bar code) is checked by registration scanner 93 and corrections made as needed.

The planar elements are then advanced to the proper position (i.e. between plates 81 and 83 for stacking and lamination). Before each planar element is brought into place, plate 83 is lowered. Plate 83 is also equipped with suction, the suction being greater than that in plate 81. The suction in plate 83 is used mainly to pull the first planar element off of plate 81. After the planar element is properly aligned, plate 83 is raised to laminate by pressure the color profile CP just brought into place and being held on belt 73 by suction with stack ST of elements resting on plate 83. Plate 83 is then lowered carrying with it the newly laminated profile and the process repeated. Suction is applied to plate 83 at the appropriate time to pull the planar elements in the stack down with it as plate 83 is lowered carrying with it newly laminated profile and also the help pull off the planar element which is on belt 73. The linear actuators 85 and 87 which are used to move plate 83 up and down are controlled by computer 13-1.

Figure 11:
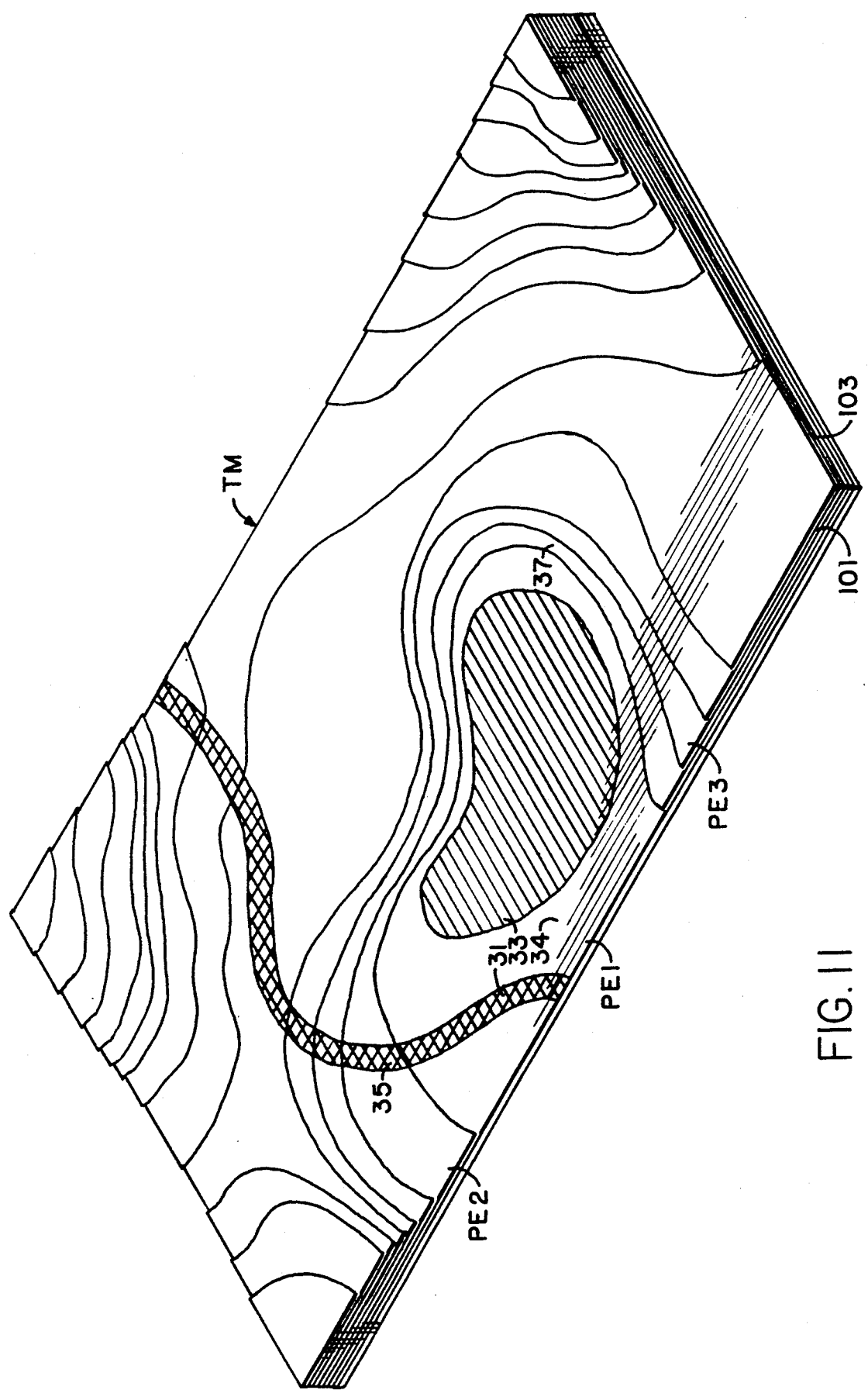
FIG. 11 is a perspective view of the three-dimensional surface as it appears after construction according to the present invention.

A perspective view of the completed topographical model is shown in FIG. 11. For simplicity, areas to be colored green, such as areas 34 and 37 are shown without hatch lines.

As can be fully appreciated, each planar element PE is essentially a two-dimensional plot and one can easily use the apparatus for this purpose instead of for making three dimensional surfaces, when desired.

Other embodiments of the invention (not shown) use alternate means to handle the material which is being colored, cut and laminated:

One such embodiment employs an apparatus which is similar to that shown in FIG. 1, but eliminates the need for cut-off shears 89 and 91 by using material which is provided on a "release" web. The release web is designed to hold the material by light and detachable adhesion, while cutting is done by a computer guided device such as a knife or laser which can be controlled to only cut completely through the one layer of material to be laminated. The waste material which is cut away from the profiles at station 69 can be removed prior to lamination by a device such as 93 and 95 or it can be left in position on the release web, for removal with the web after lamination. The release web is advanced so as to locate the profiles properly on the upper press plate or a press roller. The lamination is made with pressure, then the release web is pulled free and removed to clear the way for another lamination.

Other embodiments of the invention alter the sequence of operations. For example, by using a type of an XY cutting device which is designed to cut through only the top layer of a stack of layers of material, the material can be adhered to the constructed model form prior to being cut to shape. Once the waste is cut free, it can be removed and the lamination completed with a device such as a pressure roller equipped with heat or other means, to assist in bonding of the material. An example of such XY cutting device is the computer controlled knife system Series 200 manufactured by the Aristo Graphic Systeme GMBH and Co. of Hamburg, West Germany. One might use the same basic XY mechanism to also perform the coloring operation, after the material is adhered to the form, simply by switching tools (i.e. replacing the cutting tool with an inking tool). An example of an apparatus having such a mechanism is shown in FIGS. 13 through 17, the apparatus being identified generally by reference numeral 111.

In apparatus 111, as will hereinafter be described in more detail, the planar elements are not made (i.e. cut to shape and size and colored) and then stacked one on top of the other and laminated in place to construct the form. Instead, a length of the material is placed on the form itself that is actually being constructed and then while it is disposed on the form is made into the appropriate planar element.

Apparatus 111 includes a computer station 13 and a form constructing station 113. For simplicity, portions of the apparatus not pertinent to the invention, such as the lines connecting the computer in computer stations to the parts controlled by the computer and the motors and support for the various rollers and other movable parts, are not shown.

Form constructing station 113 includes a press plate 115, which is equipped with suction, a plurality of linear actuators, two of which are shown and labelled 117 and 119, for supporting press plate 115 and selectively moving press plate 115 up and down, a pair of side rails 120 and 121, selectively movable up and down by a motor (not shown), a tool holder assembly 125 including a tool holder 127 which is movable in the x and y direction and rotatable 360 degrees all by motors (not shown), a storage rack 129 having pens 131, knives 133 and a pickup device 134, a material supply reel 135 having an associated idler roller 135-1, a supply of sheet material 136 which is coated with a pressure sensitive adhesive on its bottom side on supply reel 135, a material take up reel 137 having an associated idler roller 138, a first pair of connected rollers 139 and 140, a second pair of connected rollers 141 and 142 and a pressure roller 143.

Tool holder 127 includes a mechanism 128 for pickup and dropping off pens, knifes and/or the pickup device.

As can be appreciated press plate 115 and tool holder assembly 125 taken together are similar to a conventional XY plotter.

Rollers 139-143 are movable back and forth (from left to right and right to left in the drawings) by appropriate motors, 144-1, 144-2 and 144-3, respectively, which are coupled to the rollers through rack and pinions 144-4, 144-5 and 144-6 respectively.

All of the motors which move the various components in form constructing station 113 are controlled by the computer in computer station 13.

Form construction station 113 processes sheet material 136 to produce the desired colored surface in the following manner.

First, tool holder 127 is placed in a "waiting" position clear of rollers 139-143 and rollers 139-143 are moved to the take-up reel 137 side of press plate 115. Then, with side rails 120 and 121 lowered sheet material 136 is fed from supply reel 135 between rollers 139 and 140, between rollers 141 and 142 and under roller 138 to take up reel 137. Side rails 120 and 121 are then raised into position so that their top surfaces are flush with the top of the form surface (i.e. the layer just formed, or, if the planar element to be formed is the bottom planar element with the top surface of press plate 115). The apparatus at this stage in the procedure is shown in FIG. 13.

Figure 13:
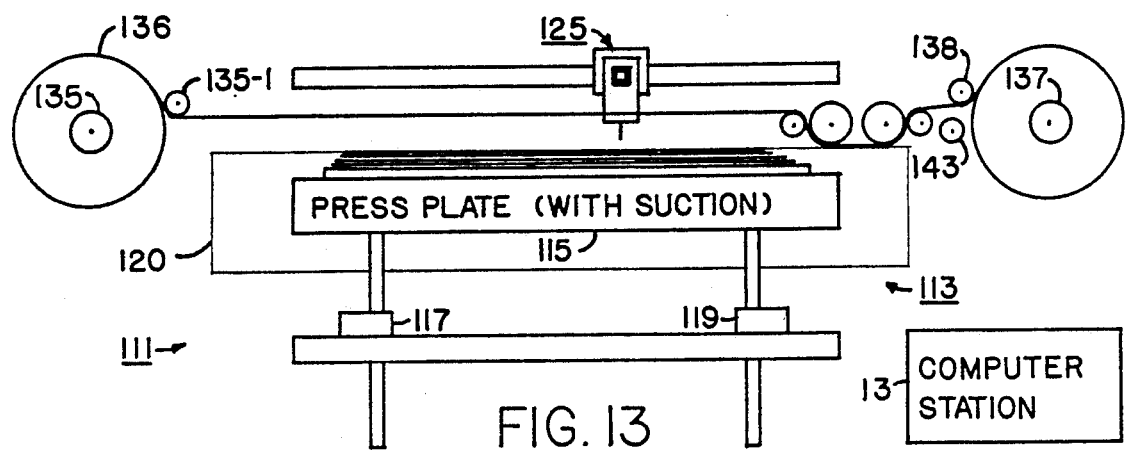
FIG. 13 is a simplified diagrammatic representation of another embodiment of an apparatus of the invention as it appears at the start of the procedure for making one of the planar elements.

Then, roller 139 is rolled across side rails 120 and 121 from the take-up reel end to the supply reel end (from right to left as shown in FIG. 13), carrying with it roller 140, and in the course thereof pressing the edges of sheet material 136 down on the side rails 120 and 121 and the portion of sheet material 136 between side rails 120 and 121 down on the form to be constructed, lightly sticking it in place.

Figure 14:
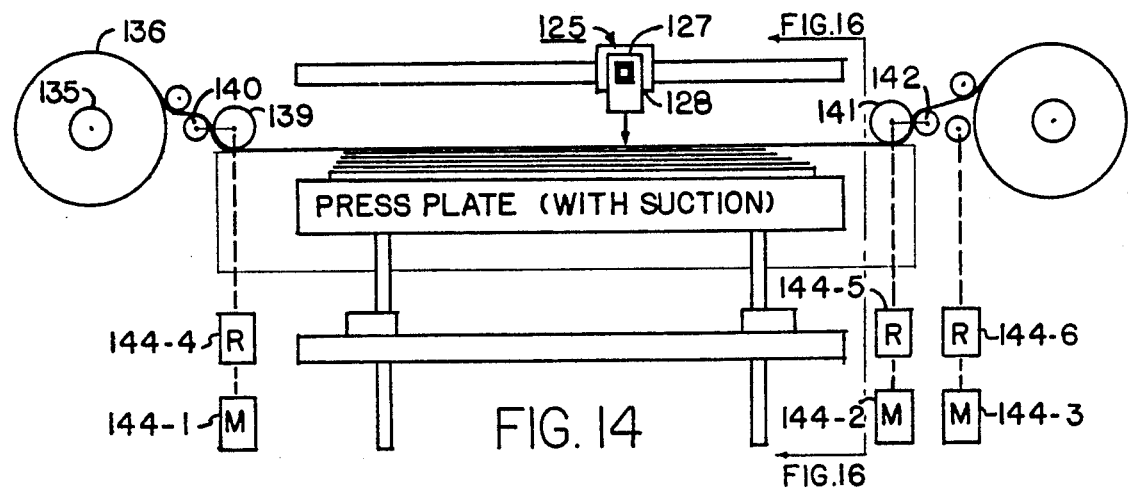
FIG. 14 is a simplified diagrammatic representation of the apparatus shown in FIG. 13 as it appears at a larger stage in the procedure.

Then, tool holder 127, under the direction of the computer in computer station 13 and using the differently colored pens 131 as needed and a knife blade 133, draws the appropriate colored profile on sheet material 136 and cuts the profile to shape to define a planar element. Knife blade 133 may also be used, if desired, to make slits throughout the planar element being formed to prevent blistering when the planar element is subsequently laminated in place. FIG. 14 shows the apparatus at this point in the procedure. Tool holder 127 then uses pick up device 134 (which is equipped with suction or some mechanical means) to pick up any waste material which has been cut completely from the web.

Figure 15:
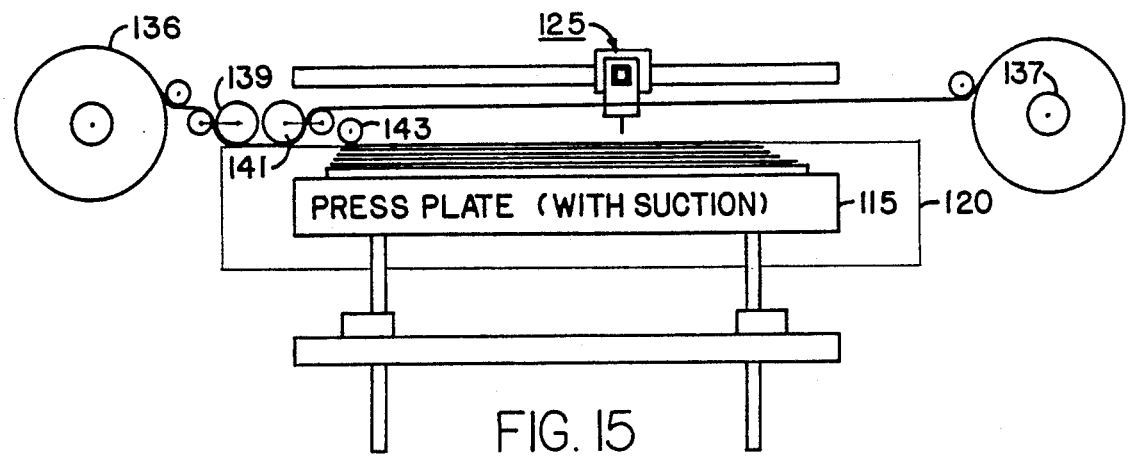
FIG. 15 is a simplified diagrammatic representation of the apparatus shown in FIG. 13 as it appears at the completion of the procedure.
Figure 16:
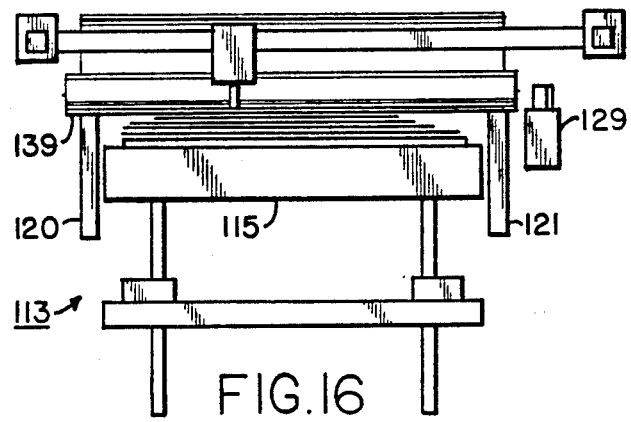
FIG. 16 is an end view of the apparatus shown in FIG. 13.
Figure 17:
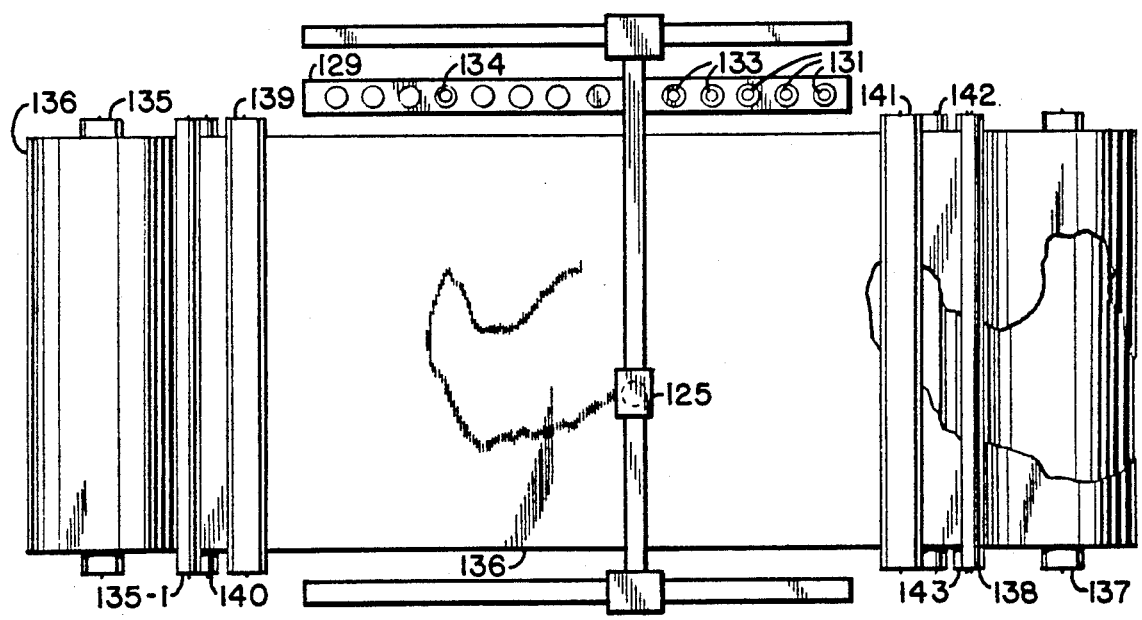
FIG. 17 is a plan view of the apparatus shown in FIG. 13.

Then, roller 141 is rolled across the form along side rails 120 and 121 (from right to left in FIG. 14), carrying with it roller 142, so as to raise the loose web i.e. the portion of the sheet material outside of the planar element, up for disposal. Sheet material 136, after being raised by roller 141 appears as shown in FIG. 15. As can be appreciated, the planar element that has just been constructed will not be raised as roller 141 moves from right to left since the planar element is completely detached from the web. Roller 141 may include suction to help lift up the loose web.

Then, roller 143, which serves as a pressing roller is rolled across the form (i.e. from left to right) to complete the bonding of the planar element so formed to the planar element directly underneath it (or the base for the form in the case of the bottom planar element).

Roller 143 may be equipped with heat to assist in the bonding.

The position of all of the rollers at this stage in the procedure is shown in FIG. 15.

Then, side rails 120 and 121 and press plate 115 are lowered, incrementally, to allow rollers 139-143 to be returned to the take up reel side (as shown in FIG. 13)

Once side rails 120 and 121 and press plate 115 have been lowered, rollers 139-143 are moved to the take up reel side. As rollers 139-143 are returned they do not rotate, instead reel 135 unrolls new material and reel 137 rolls up wast material.

The procedure is then repeated to form successive planar elements, as needed, to make the entire surface.

As is apparent, the exact position of sheet material 136 is not critical since the computer will control where the successive planar elements will be formed on the sheet material.

Figure 12:
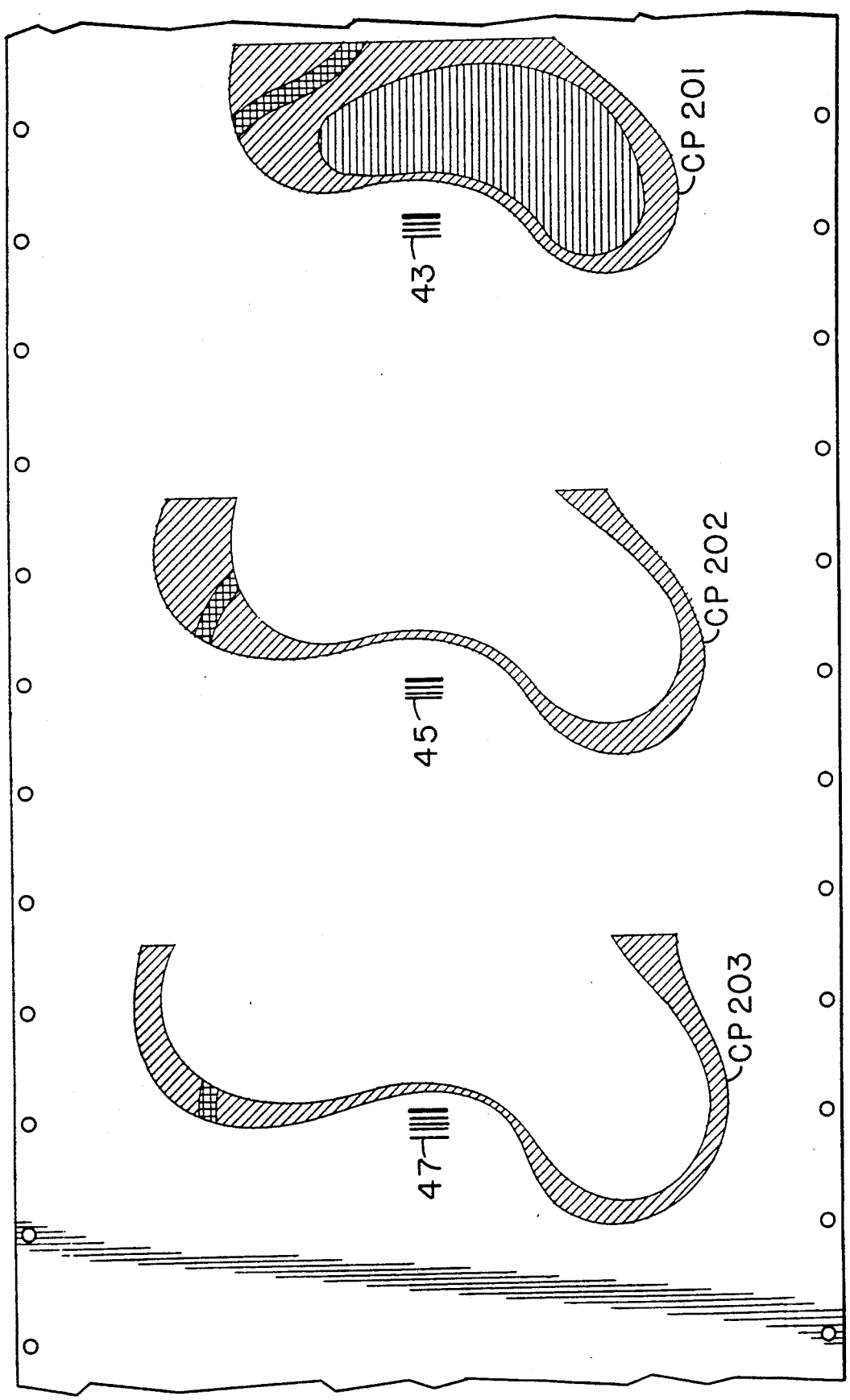
FIG. 12 is a plan view showing a modification of the color profiles shown in FIG. 4.

The embodiments of the present invention described above are intended to be merely exemplary and those skilled in the art shall be able to make numerous variations and modifications without departing from the spirit of the present invention. For example, in the FIG. 1 embodiment, the sheet material used may be one that already has a layer of an adhesive or other bonding material such as in the FIG. 13 embodiment and the adhesive application station can accordingly be eliminated. Also, in all embodiments the color profiles may be formed on both sides of sheet material and not merely one side. Also, in the FIG. 1 embodiment shears 89 and 91 could, if desired, be used to make all transverse cuts on sheet material 27, instead of simply cutting the tab portions. It should also be noted that it is not essential that the color profiles define the entire outline of the respective planar elements, especially since the perforations are applied and the various cuttings performed according to instructions from the computer and not by observing or sensing the location of the color profiles. Color need only be applied on areas of the planar elements that will show when the planar elements are stacked and furthermore only on those areas where one wishes to have the edges appear colored. For example, in the topographical model TM that is illustrated in FIG. 11, the sides (i.e. side edges) such as side 101 and 103 are not of interest or importance and consequently need not appear to be colored and the profile portion which produces those edges need not even be drawn. Thus, the color profiles can be shaped to contain only portions of interest. For example, profiles for the first three planar elements PE1, PE2 and PE3 can if desired, be drawn to appear as shown in FIG. 12, the modified profiles being identified CP201, CP202 and CP203.

Instead of being in the form of a roll, the sheet material could be in the form of a stack of sheets, either connected or unconnected, with the supply and take up assemblies being modified accordingly. Also, instead of using "drum" type stations in the FIG. 1 embodiment in which the tools move in the "Y" direction and the material is advanced in the "X" direction, "flat-bed" type stations could be employed in which the material is fixed and the tools move in the "X" and "Y" directions. Furthermore, the tool holder 127 in the FIG. 13 embodiment could also be used to hold a device to apply an adhesive to a planar element just made or a device to selectively press down on a planar element to be laminated or a device to apply heat, radiation, ultrasonic vibration or other means to contribute to the bonding of the planar elements. Also, the planar elements could be made by the selective hardening of a liquid instead of the cutting of a sheet of material. Finally, instead of drawing a color pattern on sheet material using a pen or other similar drawing instrument, a color pattern could be produced on the sheet material electrophotographically.

All such variations and modifications noted above are intended to be within the scope of the present invention as defined in the appended claims.

What is claimed is:

1. A method of constructing a three-dimensional surface of predetermined shape and having a predetermined color pattern, the method comprising the steps of:
   a. providing information corresponding to the shape and to the color pattern of said three-dimensional surface at a plurality of different cross-sections and information corresponding to the order of the cross-sections,
   b. providing a length of sheet material, the sheet material having a top surface, a bottom surface and an edge, the sheet material being either ink absorbing or a material which will transmit color through an edge when colored on either the top surface or the bottom surface in the vicinity of the edge.
   c. producing a series of color profiles on either the top surface or the bottom surface of said sheet material using said information and using either a liquid or dry coloring agent if the sheet material is one that will transmit color through an edge when colored on either the top surface or bottom surface in the vicinity of the edge or a liquid coloring agent capable of being absorbed if the sheet material is ink absorbing, each color profile corresponding to the shape and to the color pattern of said three-dimensional surface at a different cross-section, then
   d. removing all of the sheet material outside of each color profile so produced so as to leave a series of unconnected individually shaped planar elements, each planar element having a shape in accordance with its color profile, and then
   e. stacking the planar elements so produced adjacent one to another in the order of the cross-sections to which they correspond to form said three-dimensional surface.
   f. whereby, the color perceived of the three-dimensional surface so produced will correspond to the color of the color profiles planar elements.

2. The method of claim 1 and further including the step of applying adhesive to one surface of said sheet material for use in securing said planar elements together.

3. The method of claim 2 and further including perforating the sheet material to prevent blistering when said planar elements are attached together.

4. The method of claim 3 and further including the step of applying unique marks on each planar element for registration and identification purposes.

5. The method of claim 4 and further including displaying a two-dimensional representation of said three-dimensional surface using said predetermined information.

6. The method of claim 4 and further including the step of forming a cut along a portion of each profile so formed.

7. The method of claim 1 and further including the step of laminating the stack of planar elements together.

8. The method of claim 1, the edge of each planar element appearing colored according its color profile.

9. Apparatus for constructing a three-dimensional surface of predetermined shape and color from information corresponding to the shape and color of the three-dimensional surface at a plurality of different cross-sections using a length of sheet material, the length of sheet material having a top surface, a bottom surface and an edge, the sheet material being either ink absorbing or a material that will transmit color through an edge when colored on either the top surface or the bottom surface in the vicinity of the edge, the apparatus comprising:
   a. means for producing on said top surface or said bottom surface of said sheet material a series of color profiles in sequence along its length using either a liquid or dry coloring agent if the sheet material is one that will transmit color through an edge when colored on either the top surface or the botton surface in the vicinity of the edge or a liquid coloring agent capable of being absorbed if the sheet material is ink absorbing, each color profile corresponding to a different cross-section of the three-dimensional surface,
   b. removing means for detaching the sheet material outside of each color profile so as to form a series of unconnected shaped planar elements,
   c. stacking and laminating means for stacking and laminating the planar elements so produced adjacent one to another in the order of the cross-sections to which they correspond to form said three dimensional surface, the color perceived of the resulting three dimensional surface corresponding to the color of the individual planar elements, and
   d. moving means for moving said sheet material through said producing means and through said removing means to said stacking and laminating means.

10. The apparatus of claim 9 and further including perforating means for perforating at least a portion of the material inside each color profile.

11. The apparatus of claim 9 and further including adhesive means for applying adhesive to said sheet material for use in laminating said planar elements together.

12. The apparatus of claim 9 and wherein said laminating means includes a press assembly.

13. The apparatus of claim 9 and further including profile cutting means for forming a cut along a portion of each color profile so formed.

14. The apparatus of claim 9 and further including a computer for controlling the operation of the plotting, stacking and laminating means.

15. A method of constructing a three-dimensional surface of predetermined shape and color pattern, the method comprising the steps of:
   a. providing information corresponding to the shape and to the color pattern of the three-dimensional surface at a plurality of different cross-sections and information corresponding to the order of the cross-sections, b. providing a length of sheet material that is either ink absorbing or will transmit color through an edge when colored on either the top surface or the bottom surface in the vicinity of the edge, c. constructing a planar element from a portion of said length of sheet material, the planar element having a shape corresponding to a cross-section of the three dimensional surface and having color applied on the top surface or the bottom surface at least around the vicinity of the edge so as to define a colored border, the color being applied using either a liquid or dry coloring agent if the sheet material is one that will transmit color through an edge when colored on either the top surface or the bottom surface in the vicinity of the edge or a liquid color agent capable of being absorbed if the sheet material is ink absorbing d. placing another portion of said length of sheet material on said planar element so constructed, then e. constructing another planar element from said other portion of said length of sheet material in registration with said previously formed planar element and having a shape and being colored according to another cross-section, and then f. repeating steps (d) and (e) above to form the three-dimensional surface of predetermined shape and color pattern, g. the planar elements being formed in the order of the cross-sections to which they correspond.

16. The method of claim 15 and further including the step of laminating said planar elements together.

17. The method claim 16 and further including the step of making openings in the sheet material to prevent blistering when said planar elements are attached together.

18. A method constructing a three-dimensional surface of predetermined shape and color pattern, the method comprising the steps of:

a. providing information corresponding to the shape and to the color pattern of said three-dimensional surface at a plurality of different cross-sections, b. providing sheet material, the sheet material having a top surface, a bottom surface and an edge and being either ink absorbing or a type of material that will transmit color when colored on either the top surface or the bottom surface in the vicinity of the edge, c. forming a series of color profiles on said sheet material using either a liquid or dry coloring agent if the sheet material is color transmissive or a liquid coloring agent capable of being absorbed if the sheet material is ink absorbing, each color profile relating to a different cross-section, d. removing sheet material in a manner so as to leave a series of unconnected individually shaped planar elements, each color profile defining the outline of at least a portion of its planar element, and e. stacking the planar elements so produced adjacent one to another in the order to cross-sections to which they correspond to form said three-dimensional surface, the color perceived of the three-dimensional surface so produced corresponding to the color of the individual color profiles on the planar elements.

19. A method of constructing a three-dimensional surface of predetermined shape and color, the method comprising the steps of:

a. providing information corresponding to the shape and color of the three-dimensional surface taken over a plurality of different cross-sections and information corresponding to the order of the cross-sections, b. providing sheet material that has a top surface, a bottom surface and an edge and is either ink absorbing or will transmit color through an edge when colored on either the top surface or the bottom surface in the vicinity of the edge, c. constructing a planar element from a portion of said sheet material, the planar element having a shape corresponding to a cross-section of the three dimensional surface and having color applied on at least a portion of the top surface or the bottom surface in the vicinity of the edge, the color where applied defining the outling of at least a portion of the planar element, the color being applied using either a liquid or dry coloring agent if the sheet material is one that will transmit color through an edge when colored on the top surface or the bottom surface in the vicinity of the edge or a liquid coloring agent capable of being absorbed if the sheet material is ink absorbing, d. placing another portion of said sheet material on top of said planar element so constructed, e. constructing another planar element from said other portion of said sheet material, said other planar element being in registration which said previously formed planar element and having a shape and being colored according to another cross-section, f. repeating steps (d) and (e) above to form the three-dimensional surface, g. the planar elements being formed in the order of the cross-sections to which they correspond.

20. The method of claim 19 and wherein constructing said first planar element comprises cutting said sheet material to define the shape of said first planar element and wherein constructing said second planar element comprises cutting said other portion of sheet material while placed on top of said first planar element.

21. A method of constructing a cross section of a form of predetermined shape and color comprising:

a. storing in a computer information corresponding to the shape and color of the cross-section, b. providing a length of sheet material having a top surface, a bottom surface and an edge and being either ink absorbing or one that will transmit color through an edge when colored on either the top surface or the bottom surface in the vicinity of the edge, c. producing, on instructions from said computer, a color pattern on either the top surface or the bottom surface of said sheet material corresponding to the shape and color of the cross-section, using either a liquid or dry coloring agent if the sheet material is one that will transmit color through an edge when colored on either the top surface or the bottom surface in the vicinity of the edge or a liquid coloring agent capable of being absorbed if the sheet material is ink absorbing, and d. using said information cutting away all of the material outside of said color pattern, e. whereby, said material remaining will correspond in shape and color to said cross-section.

22. Apparatus for constructing a three-dimensional surface of predetermined shape the apparatus comprising:
   a. a computer for storing information corresponding to said three dimensional surface at a plurality of cross-sections,
   b. a length of sheet material,
   c. means responsive to instructions from said computer for producing on said sheet material a series of color profiles each profile correponding to a different cross-section of the three-dimensional surface,
   d. removing means for detaching the sheet material outside of each planar element so as to form a series of unconnected shaped planar elements, and
   e. stacking and laminating means for stacking and laminating the planar elements adjacent to one another in the order of the cross-sections to which they correspond.

23. A method of constructing a three-dimensional surface of predetermined shape and having a predetermined color pattern, the method comprising the steps of:
   a. storing in a computer information corresponding to the shape and to the color pattern of said three-dimensional surface over a plurality of cross-sections,
   b. providing a length of sheet material having a top surface, a bottom surface and an edge and which is either or ink absorbing or will transmit color through an edge when colored on either the top surface or the bottom surface in the vicinity of the edge,
   c. drawing a series of color profiles on either the top surface or the bottom surface of said sheet material along its length on instructions from said computer and using either a liquid or dry coloring agent if the sheet material is one that will transmit color through an edge when colored on either the top surface or the bottom surface in the vicinity of the edge or a liquid coloring agent capable of being absorbed if the sheet material is ink absorbing, each color profile corresponding to the shape and to the color pattern of said three-dimensional surface at a different cross-section, then
   d. removing sheet material outside of each color profile in a manner so as to leave a series of unconnected individually shaped planar elements, each planar element having a shape in accordance with its color profile, and then
   e. stacking the planar elements so produced adjacent one to another in the order of the cross-sections to which they correspond to form said three-dimensional surface, the surface color perceived of the three-dimensional surface so produced corresponding to the shape and color pattern of the individual color profiles on the planar elements.

24. The method of claim 23 and wherein the sheet material is attached to a release web and wherein removing the sheet material outside of the color profile to form the planar element comprises cutting through the sheet material according to the shape of the color profile and then removing the release web from the color planar element so formed.

25. Apparatus for constructing a three-dimensional surface of predetermined shape and color from information corresponding to the shape and color of the three-dimensional using a length of sheet material, the apparatus comprising:
   a. a computer for storing said information,
   b. means responsive to said computer for producing on said sheet material a series of color profiles on either the top surface or the bottom surface thereof each color profile corresponding to a different cross-section of the three-dimensional surface,
   c. removing means responsive to said computer for detaching all of the sheet material outside of each planar element so as to form a series of unconnected shape planar elements,
   d. stacking and laminating means responsive to said computer for stacking and laminating the planar elements so produced adjacent to one another in the order of the cross sections to which they correspond to form said three dimensional surface, the color perceived of the resulting three dimensional surface corresonding to the color of the individual color profiles in the planar elements, and
   e. moving means responsive to said computer for moving said sheet material through said plotting means and through said removing means to said stacking and laminating means.

26. A method of constructing a three-dimensional surface of predetermined shape and having a predetermined color pattern, the method comprising the steps of:
   a. providing information corresponding to the shape and to the color pattern of said three-dimensional surface at a plurality of different cross-sections and information corresponding to the order of the cross-sections,
   b. providing a length of sheet material, the sheet material having a top surface, a bottom surface and an edge, the sheet material being either ink absorbing or a material which will transmit color through an edge when colored on either the top surface or the bottom surface in the vicinty of the edge,
   c. constructing a plurality of planar elements from said length of sheet material using said information, each planar element having a shape corresponding to a cross-section of the three dimensional surface and having color applied on either the top surface or the bottom surface in the vicinity of the edge so as to define a colored border, the color applied being made using either a liquid or dry coloring agent if the sheet material is one that will transmit color through an edge when colored on the top surface of the bottom surface in the vicinity of the edge or a liquid coloring agent capable of being absorbed if the sheet material is ink absorbing,
   d. stacking the planar elements so produced adjacent one to another in the other of the cross-sections to which they correspond to form said three-dimensional surface,
   e. whereby, the shape and color perceived of the three-dimensional surface so produced will correspond to the shape and color of the planar elements as so stacked.

27. Apparatus for constructing a three-dimensional surface of predetermined shape and color from information corresponding to the shape and color of the three-dimensional surface at a plurality of different cross-sections, the apparatus comprising:
   a. a form constructing station for forming the three-dimensional surface, and b. a computer for controlling the operations of the form constructing station,
c. the form constructing station including:
  i. a supply reel for holding a quantity of sheet material, the sheet material having a top surface, a bottom surface and an edge and being either ink absorbing or a material that will transmit color through an edge when colored on either the top surface or the bottom surface in the vicinity of the edge, the bottom surface of the sheet material being coated with a pressure sensitive adhesive,
  ii. a take up reel for receiving sheet material from the supply reel,
  iii. a press plate equipped with suction disposed between said supply reel and said take up reel underneath said sheet material and movable up and down,
  iv. movable roller means for pressing the sheet material between the supply reel and the take up reel down over the press plate, and
  v. means for drawing a color profile on the sheet material while it is over the press plate, cutting the color profile to shape while it is over the press plate and removing waste material from the color profile so cut.

28. A method of constructing a three-dimensional surface of predetermined shape, the method comprising the steps of:
  a. providing information corresponding to the shape of the three-dimensional surface taken over a plurality of different cross-sections and information corresponding to the order of the cross-sections,
  b. providing sheet material,
  c. constructing a planer element from a portion of said sheet material, the planar element having a shape corresponding to a cross-section of the three dimensional surface, then
  d. placing another portion of said sheet material on top of said planar element so constructed, then
  e. constructing another planar element from said other portion of said sheet material, said other planar element being in registration with said previously formed planar element and having a shape according to another cross-section,
  f. repeating steps (d) and (e) above to form the three-dimensional surface,
  g. the planar elements being formed in the order of the cross-sections to which they correspond.

* * * * *